United States Patent [19]

Dudgeon

[11] Patent Number: 4,480,059
[45] Date of Patent: Oct. 30, 1984

[54] EPOXY ADHESIVES FOR POLY(BUTYLENE TEREPHTHALATE)

[75] Inventor: Charles D. Dudgeon, Clifton Park, N.Y.

[73] Assignee: General Electric Company, Schenectady, N.Y.

[21] Appl. No.: 411,763

[22] Filed: Aug. 26, 1982

[51] Int. Cl.³ .................... C08G 59/68; C08G 59/62
[52] U.S. Cl. .................................. 523/466; 523/456; 525/337; 525/340; 525/359.1; 525/359.2; 525/354.4; 525/506; 525/523; 528/88; 528/89; 528/91; 528/92; 528/110; 528/410; 528/408
[58] Field of Search ............... 528/88, 89, 91, 92, 528/110, 410, 408; 204/159.11, 159.18; 525/337, 340, 359.2, 359.4, 359.1, 506, 523; 523/466, 456

[56] References Cited

U.S. PATENT DOCUMENTS

| | | | |
|---|---|---|---|
| 4,173,551 | 11/1979 | Crivello | 528/92 X |
| 4,192,924 | 3/1980 | Crivello | 528/92 X |
| 4,225,691 | 9/1980 | Crivello | 528/92 X |
| 4,275,190 | 6/1981 | Dudgeon | 528/361 |
| 4,283,312 | 8/1981 | Crivello | 528/92 X |
| 4,342,673 | 8/1982 | Wolfrey | 528/92 X |

*Primary Examiner*—Earl A. Nielsen
*Attorney, Agent, or Firm*—Donald J. Voss

[57] ABSTRACT

Improved thermally-curable adhesive compositions for bonding articles of poly(butylene terephthalate) together or to other articles are disclosed. The adhesive compositions comprise at least one epoxidic prepolymer having two or more epoxy groups, an aromatic halonium complex salt thermal initiator dissolved in a compatibilizing non-epoxidic organic liquid, a copper carboxylate salt cocatalyst, a polyhydric alcohol, and optionally, silica filler. The adhesive compositions when heated, cure to form an adhesive bond between articles of poly(butylene terephthalate) which exhibits a vastly improved bond strength over presently available epoxy adhesive materials.

7 Claims, No Drawings

EPOXY ADHESIVES FOR POLY(BUTYLENE TEREPHTHALATE)

BACKGROUND OF THE INVENTION

The present invention relates to adhesive compositions for plastics. More particularly, it relates to heat curable adhesive compositions for use with poly(butylene terephthalate) substrates.

Thermoplastic resins based on poly(1,4-butylene terephthalate) have become well known in industry. They are used in widely diverse applications where their high tensile and impact strengths make them extremely valuable. In many of these applications it is necessary to bond a sheet, film or molded article of the resin to itself or to other materials.

Presently known adhesives generally fail to provide satisfactory bond strength in cementing poly(1,4-butylene terephthalate) to itself or other materials. For instance, adhesives based on polyvinyl acetate have not been found useful because they provide a low bond strength. Similarly, the commonly used epoxy adhesives, such as those sold in home repair kits which contain the diglycidyl ether of bisphenol-A and a hardener, such as ethylene triamine, have proved useful only for applications where a bond strength of about 500 psi is satisfactory.

Recently, there have been advances in the polymer arts wherein new liquid compositions are now available which may be cured by heat or light to form solid materials. Examples of such compositions are described in commonly assigned Crivello, U.S. Pat. Nos. 4,026,705; 4,058,401 and 4,173,551. Of particular interest is U.S. Pat. No. 4,173,551, relating to thermocurable compositions which include a cationically polymerizable organic material, an aromatic halonium salt thermoinitiator, and a cocatalyst selected from the group consisting of a copper salt, an organic acid, or mixtures thereof and which may be used as adhesives, as well as for many other applications.

Still more recently, in U.S. application Ser. No. 399,041, filed Jul. 16, 1982, now abandoned by L. T-K. Nyeu and assigned to the same assignee as the present invention, epoxy adhesives for use with poly(butylene terephthalate) resin substrates are described which exhibit improved bond strengths of more than 1000 psi. The adhesive compositions described therein are comprised of an epoxidic prepolymer, a diaryliodonium complex salt thermal initiator dissolved in a compatibilizing organic liquid, a copper carboxylate salt, and optionally, finely divided silica filler.

It has been discovered that adhesive compositions for poly(butylene terephthalate) described by Nyeu can be improved to exhibit even greater adhesive bond strengths by the addition of a solvent for poly(butylene terephthalate) which is also reactive with epoxy resins.

SUMMARY OF THE INVENTION

In accordance with the subject invention, new and improved adhesive compositions for bonding poly(butylene terephthalate) substrates are provided in the form of a composition comprising:

(a) at least one epoxidic prepolymer containing two or more epoxy groups;

(b) an effective amount of an aromatic halonium complex salt thermal initiator dissolved in a compatibilizing non-epoxidic organic liquid;

(c) a catalytic amount of a copper carboxylate salt cocatalyst; and (d) a bond strength improving amount of a polyhydric alcohol.

In a preferred embodiment the compositions of the subject invention comprise the diglycidyl ether of bisphenol-A, diphenyliodonium hexafluoroarsenate dissolved in propylene carbonate, copper stearate, and ethylene glycol.

The new and improved adhesive compositions of the subject invention are cured or hardened by heating. Upon heating the polyhydric alcohol acts to soften and render tacky the surface of poly(butylene terephthalate) thereby increasing its receptivity to adhesive bonding. The polyhydric alcohols are reactive with the epoxy groups of the epoxidic prepolymer and become an integral part of the cured adhesive. After curing they will no longer exert an undesirable solvent action on the plastic substrate.

The new and improved epoxy adhesive compositions of the subject invention bond articles of poly(butylene terephthalate) to each other or to other materials with an adhesive bond having superior bond strength.

Other objects and advantages of the subject invention will become apparent from the following detailed description.

DETAILED DESCRIPTION OF THE INVENTION

The epoxidic prepolymers for use with the subject invention include any organic compounds having two or more oxirane rings, e.g.,

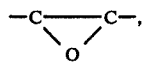

polymerizable by ring opening. Such materials, broadly referred to as epoxides, include monomeric epoxy compounds and epoxides of the polymeric type, and can be aliphatic, cycloaliphatic, aromatic or heterocyclic. The materials which are useful in this invention generally have, on the average, from 2 to about 5 polymerizable epoxy groups per molecule. The polymeric epoxides include linear polymers having terminal epoxy groups (e.g. a diglycidyl ether of a polyalkylene glycol), polymers having skeletal oxirane units (e.g. polybutadiene polyepoxide), and polymers having pendent epoxy groups (e.g. a glycidyl methacrylate polymer or copolymer). The epoxides may be pure compounds but are generally mixtures containing two or more epoxy groups per molecule. Thus, the epoxides used may be mixtures of various types of materials, so long as the "average" epoxide functionality of the mixture is in the range of about 2 to 5. The "average" number of epoxy groups per molecule is determined by dividing the total number of epoxy groups in the epoxy-containing material by the total number of epoxy molecules.

Examples of epoxides containing a plurality of epoxy functional groups include resins resulting from the reaction of bisphenol-A (4,4'-isopropylidenediphenol) and epichlorohydrin, or by the reaction of low molecular weight phenolformaldehyde resin (Novolak resin) with epichlorohydrin. These materials may be used alone or in combination with an epoxy-containing compound as a reactive diluent. Diluents such as phenyl glycidyl ether, 4-vinylcylohexene dioxide, limonene dioxide, 1,2-cyclohexene oxide, glycidyl acrylate, glycidyl methacrylate styrene oxide, allyl glycidyl ether, etc. may be added as viscosity modifying agents.

These useful epoxy-containing materials may vary from low molecular weight monomeric materials to high molecular weight polymers and may vary greatly in the nature of their backbone and substituent groups. For example, the backbone may be of any type and substituent groups thereon can be any groups free of an active hydrogen atom which is reactive with an oxirane ring at room temperature. Illustrative of permissible substituent groups include halogen, ester groups, ethers, sulfonate groups, siloxane groups, nitro groups, phosphate groups, etc. The molecular weight of the epoxy-containing materials may vary from 58 to about 100,000 or more.

The preferred epoxy-containing material is the diglycidyl ether of bisphenol-A. Other desirable epoxy-containing materials include those which contain cyclohexene oxide groups such as the epoxycyclohexanecarboxylates, typified by 3,4-epoxycyclohexylmethyl-3,4-epoxy-cyclohexane carboxylate, 3,4-epoxy-6-methylcyclohexylmethyl-3,4-epoxy6-methylcyclohexane carboxylate, and bis(3,4-epoxy-6-methylcyclohexylmethyl) adipate. For a more detailed list of useful epoxides of this nature, reference is made to U.S. Pat. No. 3,117,099 incorporated herein by reference.

The aromatic halonium complex salt thermal initiators for use in the subject invention include diaryliodionium salts of the formula, $$[(R)_a(R')_bI]_c^+[MQ_d]^{-(d-e)}$$

where R is a monovalent aromatic organic radical, R' is a divalent aromatic organic radical, M is a metal or metalloid, Q is a halogen radical, a is a whole number equal to 0 or 2, b is a whole number equal to 0 or 1 and the sum of a+b is equal to 2 or the valence of I, c=d−e, e equals the valence of M and is an integer equal to 2-7 inclusive and d>e and is an integer having a value to 8.

Radicals included by R can be the same or different aromatic carboxcylic radicals having from 6 to 20 carbon atoms which can be substituted with from 1 to 4 monovalent radicals selected from $C_{(1-8)}$ alkoxy, $C_{(1-8)}$ alkyl, nitro, chloro, etc. More particularly, R is phenyl, chlorophenyl, nitrophenyl, methoxyphenyl, pyridyl, etc.

Radicals included by R' of the formula are divalent radicals such as:

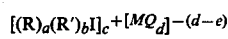

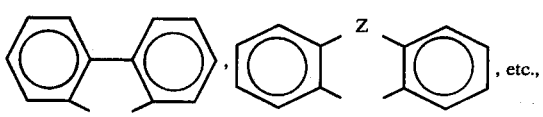

where Z is selected from —O—, —S—, S, S, (CH$_2$)$_n$, C, —N—, $R^2$ is $C_{(1-8)}$ alkyl or $C_{(6-13)}$ aryl, and n is an integer equal to 1-8 inclusive.

Metal or metalloids included by M of the formula are transition metals such as Sb, Fe, Sn, Bi, Al, Ga, In, Ti, Zr, Sc, V, Cr, Mn, Cs, rare earth elements such as the lanthanides, for example, Cd, Pr, Nd, etc., actinides, such as Th, Pa, U, Np, etc., and metalloids such as B, P, As, etc. Complex anions included by $MQ_d^{-(d-e)}$ are, for example, $BF_4^-$, $PF_6^-$, $AsF_6^-$, $SbF_6^-$, $FeCl_4^{--}$, $SnCl_6^-$, $BiCl_5^{--}$, etc.

Iodonium salts included by the formula are, for example,

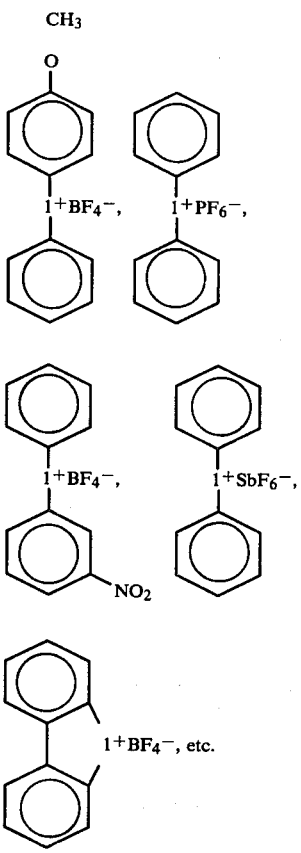

Iodonium salts of the formula can be made by the procedure in Crivello U.S. Pat. No. 3,981,897, assigned to the same assignee as the present invention, where contact between an aryl halonium bisulfate and the corresponding hexafluoro acid or salt can be effected under aqueous conditions. The iodonium salts also can be made by the procedures described by O. A. Ptitsyna, M. E. Pudecva et al., Dokl, Akad. Nauk, SSSR, 163 383 (1964); Dokl., Chem., 163 671 (1965), F. Marshall Beringer, M. Drexler, E. M. Gindler, etc., J. Am. Chem. Soc., 75 2705 (1953).

The preferred aromatic halonium complex salt thermal initiator for use in the subject invention is diphenyliodonium hexafluoroarsenate.

The diphenyliodonium complex salt thermal initiators are added to the epoxidic prepolymer component of the subject invention by being first dissolved in a nonepoxidic organic liquid to form a solution which is then added to the epoxide material. The non-epoxidic organic liquid for use in the subject invention is thereby compatibilized with the epoxy-containing component. The preferred organic liquid is propylene carbonate. Other suitable organic liquids which may be used generally include the reaction products formed by the reaction of a dihydric alcohol, such as ethylene glycol, propylene glycol, 1,3- or 1,4-butanediol, etc., with phosgene.

The adhesive compositions of the subject invention further include a copper carboxylate salt as a cocatalyst for the hardening or curing reaction. The copper salts for use with the subject invention are generally copper salts of a fatty acid, and copper stearate is generally preferred. Other copper carboxylate salts for use with the subject invention include copper benzoate, copper acetate, copper gluconate, copper citrate, etc.

The new and improved adhesive compositions of the subject invention must include a polyfunctional alcohol. More particularly, the dihydric alcohols are preferred. Suitable difunctional alcohols for use with the subject invention may be selected from compounds of the formula HO—R—OH wherein R is $(CH_2)_n$, where n is an integer of from 2 to 10, or R represents a group—$(CH_2)_n$—O—$(CH_2)_n$— where n is the same as defined above. Examples of these difunctional alcohols include: ethylene glycol, which is especially preferred, diethylene glycol, 1,2- or 1,3-propanediol; 2,2-dialkylpropanediols, e.g., 2,2-dimethylpropanediol and butanediol-1,3.

The heat curable adhesive compositions of the subject invention may also include certain inactive ingredients, such as finely divided silica, silica flour, fumed silica aerogel, talc, clay, glass fibers, extenders, hydrated alumina, carbon fibers, processing aids etc., in amounts of up to 500 parts of filler per 100 parts of the epoxidic prepolymer material.

The relative quantities of the various components of the adhesive compositions of the subject invention may vary over a broad range. Typically, the epoxidic prepolymer component is present from about 50 parts to about 90 parts by weight per hundred parts of the overall composition and preferably from about 60 to about 70 parts by weight per 100 parts of the composition. The copper carboxylate salt may be present in amounts ranging from 0.01 to 2.5 parts by weight per 100 parts of the overall composition. The diphenyliodonium complex salt thermal initiator may vary from 0.1 to about 10 parts by weight per hundred parts of the overall composition. The compatibilizing, non-epoxidic organic liquid may vary from 1 part to 10 parts per weight per 100 parts of the overall composition. Finally, the polyhydric alcohol may be present in amounts varying from 1 to 20 parts by weight per hundred parts of the overall composition.

The new and improved adhesive compositions of the subject invention are provided for bonding poly(butylene terephthalate) to itself or to another material. In use, it is only necessary to lightly coat the surfaces to be joined with the adhesive composition. The surfaces are then pressed together, may or may not be clamped, and are then heated to promote the hardening or curing of the adhesive. When the adhesive compositions are cured they form a rigid bond with both surfaces.

The curing times for the adhesive compositions of the subject invention will vary according to the temperature of the cure. At temperatures of around 100° C. a curing time of up to about two hours may be required before the hardening reaction is substantially complete. At more elevated temperatures of about 150° C., suitable cures may be obtained in from 7 to 15 minutes.

The following working examples are provided to better illustrate the subject invention.

EXAMPLE I

The following adhesive composition was prepared.

| MATERIAL | PARTS BY WEIGHT |
| --- | --- |
| Epon 828 epoxy resin[a] | 60.0 |
| Ethylene glycol | 3.4 |
| Copper stearate (10% in Epon 828) | 3.4 |
| Diphenyliodonium hexafluoroarsenate (50% in propylene carbonate) | 2.7 |
| Silica flour | 29.5 |
| Aerosil 300[b] | 1.3 |
| | 100.3 parts |

[a]Diglylcidyl ether of bisphenol-A, Shell Chemical Company.
[b]Finely divided silica aerogel, DeGussa Company.

The composition was applied to molded test strips of VALOX® 325, a poly(1,4-butylene terephthalate) resin available from General Electric Company. The test strips had the dimensions 0.5"×2.5"×0.125". The adhesive composition was applied to one side at the end of each of two test strips. The ends of the test strips were then pressed together, one on top of the other, to form an overlap therebetween having an actual bonding area of 0.5". The overlapped test strips were then heated for a period of two hours in an oven heated to 100° C. When the adhered test strips had cooled, the strips were mounted on a conventional Instron tensile testing machine. An Instron tensile testing machine includes a fixed clamp and a movable clamp and is operative to apply a load against the test strip by movement of the movable clamp relative to the fixed clamp. The test strip was firmly positioned in the aligned clamps of the Instron tensile testing machine and the machine was activated. The pressure being applied by the machine when the test strip broke was recorded and was divided by the bond area between the adjoined strips to give a bond strength in psi for the cured adhesive. The test strip samples measured on the Instron tensile testing machine, failed in the substrate at an average value of 275 pounds, which corresponds to 4400 psi measured in the substrate when failure occurred. The adhesive strength measured in the bond area was therefore greater than 1100 psi.

The new and improved adhesive compositions of the subject invention when cured, bond poly(butylene terephthalate) resin substrates with improved bond strength.

EXAMPLE II

The adhesive composition of Example I was applied to identical test strips prepared from VALOX® 420, a poly(butylene terephthalate) resin available from the General Electric Company. The procedures of Example I were followed with the result that samples failed in the adhesive bond area at an average value of 1400 psi.

| MATERIALS | A PARTS BY WEIGHT | B (Control) PARTS BY WEIGHT |
| --- | --- | --- |
| Epon 828 epoxy resin[a] | 87.00 | 87.00 |
| Ethylene glycol | 5.0 | — |
| Copper stearate (10% in Epon 828) | 5.0 | 5.0 |
| Diphenyliodonium hexafluoroarsenate 50% in propylene carbonate) | 4.0 | 4.0 |
| Propylene carbonate | — | 8.00 |
| | 101.0 parts | 104.00 parts |

[a]Diglycidyl ether of bisphenol-A, Shell Chemical Company.

Test strips of VALOX® 325 were prepared as in Example I and the same procedure was followed with the samples being cured at either 100° C. or 150° C. Although failure in some cases occured in the substrate, all bond strengths are recorded as psi in the adhesive bond. The results were as follows:

| SAMPLE | CURE CYCLE | BOND STRENGTH |
|---|---|---|
| Composition A: | 15 minutes at 150° C. | 965 psi, 100% of the samples failed in substrate. |
|  | 2 hours at 100° C. | 800 psi, 100% of the samples failed in the substrate. |
| Composition B: | 15 minutes at 150° C. | 895 psi, 100% of samples failed in bond area, adhesive peeled of substrate. |
|  | 2 hours at 100° C. | 540 psi, 100% of samples failed in bond area. |

It is apparent that the addition of a polyhydric alcohol to epoxy adhesive compositions for use with poly(butylene terephthalate) resin substrates improved the bond strength of the adhesive.

Although the subject invention has been described with reference to preferred embodiments, it is apparent that those skilled in the art may make modifications or changes therein without varying from the scope and spirit of the subject invention as defined by the appended claims.

What is claimed is:

1. An improved heat curable adhesive composition for bonding poly(butylene terephthalate) resin substrates consisting of:
    (a) at least one epoxidic prepolymer containing two or more epoxy groups;
    (b) an effective amount of an aromatic halonium complex salt thermal initiator dissolved in a compatibilizing non-expoxidic organic liquid; and
    (c) a catalytic amount of a copper carboxylate salt cocatalyst,
   wherein the improvement comprises the addition from about 1 to about 20 parts by weight of the overall composition of a polyhydric alcohol wherein said polyhydric alcohol is a difunctional alcohol selected from compounds of the formula HO—R—OH, wherein R is $(CH_2)_n$, where n is an integer of from 2 to 10, or R represents a group, $-(CH_2)_n-O-(CH_2)_n-$, where n is the same as defined above, whereby upon heating the polyhydric alcohol acts initially to soften and render the surface of the poly(1,4-butylene terephthalate) tacky to increase its receptivity to bonding and then the alcohol reacts with the epoxy groups and becomes an integral part of the adhesive.

2. An improved adhesive composition as recited in claim 1, which further includes finely divided silica filler.

3. An improved adhesive composition as recited in claim 1, wherein said epoxidic prepolymer comprises the diglycidyl ether of bisphenol-A.

4. An improved adhesive composition as recited in claim 1, wherein said aromatic halonium complex salt thermal initiator is diphenyliodonium hexafluoroarsenate.

5. An improved adhesive composition as recited in claim 1, wherein said compatible non-epoxidic organic liquid is propylene carbonate.

6. An improved adhesive composition as recited in claim 1, wherein said copper carboxylate salt cocatalyst is copper stearate.

7. An improved adhesive composition as recited in claim 1, wherein said polyhydric alcohol is ethylene glycol.

* * * * *